Sept. 26, 1961 F. STERZER 3,002,108

SHIFT CIRCUITS

Filed Feb. 4, 1959

INVENTOR.
FRED STERZER
BY
Milton S. Winters
ATTORNEY 3,002,108
Patented Sept. 26, 1961

3,002,108

SHIFT CIRCUITS

Fred Sterzer, Monmouth Junction, N.J., assignor to Radio Corporation of America, a corporation of Delaware Filed Feb. 4, 1959, Ser. No. 791,082
12 Claims. (Cl. 307—88)

This invention relates to information handling devices, and more particularly, although in its broadest aspects not exclusively, to shift circuits such as shift registers, ring counters, and the like.

Shift circuits are used extensively in information handling systems for storing information, converting information from serial to parallel form (and vice-versa), counting, and the like. In general, prior art circuits of this type include a plurality of bistable circuits connected in cascade. Most such bistable circuits have a first stable state characterized by high current conduction and a second stable state characterized by low current conduction. The two stable states may represent, respectively, a binary "one" and a binary "zero."

It has been suggested that information handling systems use R.F. (radio frequency) signals to represent information in code form. For example, R.F. signals of one frequency and phase may represent a binary "one" in one such system, and R.F. signals of the same frequency but of opposite phase may represent a binary "zero." The term "phase script notation" is frequently used to denote generically information coding schemes of this type. Certain advantages obtain in such a system when the shift circuits are adapted to handle information expressed in the machine's own language.

It is desirable in information handling systems that the circuits and components used therein be of high speed both in response and recovery time. It is also desirable that they be reliable in operation and have low power requirements.

It is an object of the present invention to provide improved shifting circuits, such as shift registers and counters, which are of high speed both in response and recovery time.

It is another object of the present invention to provide improved shift circuits which are reliable in operation and which have low power requirements.

It is a further object of the present invention to provide novel high speed shift circuits which are adapted to handle information represented by R.F. signals.

Still another object of this invention is to provide novel high speed shift circuits which are adapted to handle information expressed in phase script notation.

Yet another object of the present invention is to provide new and improved shift registers or counters wherein a binary "one" and a binary "zero" are represented by two distinct phases of R.F. signals at the same frequency.

These and other objects are accomplished according to the present invention by providing an N stage shift circuit comprising N bistable parametric oscillator circuits connected in cascade. In one specific embodiment, wherein information is expressed in the binary code, each of the oscillators has two stable states represented by two distinct phases of parametric oscillation at the same frequency when driven by externally applied energizing signals, commonly called pump signals. Coupling between adjacent oscillator stages includes a substantially non-reciprocal energy translating device. The coupling arrangement provides a time delay close to $n$T for the coupled signals, where $n$ is any integer and T is the period of the parametric oscillations. Shifting is accomplished by interrupting the parametric oscillations for an interval of lesser duration than the aforementioned time delay. At the termination of the interruption, each oscillator resumes oscillations in a phase determined by the delayed signals coupled from the previous stage. Because the time delay lies close to $n$T, information is shifted by one stage in response to each interruption of the parametric oscillations.

The foregoing and other objects, advantages, and novel features of this invention, as well as the invention itself both as to its organization and mode of operation will be more fully apparent from the following description when read in connection with the accompanying drawing, in which like reference numerals refer to like parts, and in which.

Figures 1, 2, 3, 4:
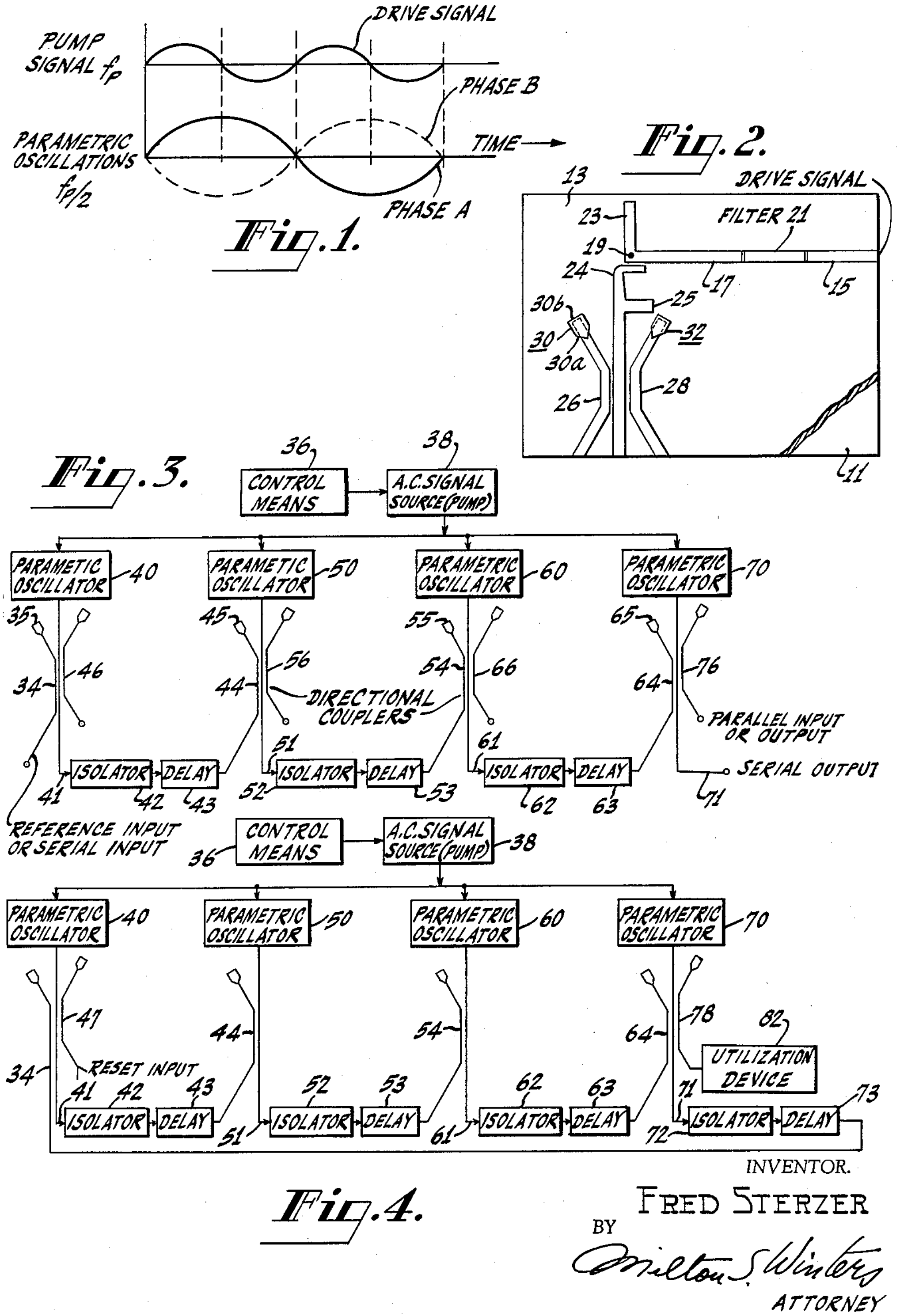
FIGURE 1 is a set of curves which illustrate the phase relationships of the two possible phases of oscillation of a bistable parametric oscillator to that of the driving signal.
FIGURE 2 is a perspective view of a parametric oscillator and coupling arrangement constructed of strip transmission line and suitable for use in practicing the present invention.
FIGURE 3 is a block diagram of a shift register according to the present invention.
FIGURE 4 is a block diagram of a ring counter according to the present invention.

Parametric oscillators, as is known, generally comprise an element of variable reactance. When the resonant frequency of the oscillator is varied at one of certain prescribed rates, as by varying the reactance of the variable element, the oscillator may be driven into parametric oscillation. This may be effected, for example, by driving or pumping the oscillator with an A.C. (alternating current) signal from an external source. The parametric oscillations are sustained so long as the driving signal exceeds a certain critical value. Assuming that the parameters of the oscillator and the amplitude of the driving signal are adjusted in known fashion so that the frequency of parametric oscillations is one-half the frequency of the driving signal, two possible phases exist in which the parametric oscillations may be sustained. These phases differ by 180° and bear a definite relationship to the driving signal. This is illustrated in FIGURE 1, which is a set of curves showing the two possible phases of oscillation, designated phase A and phase B, drawn to the same time scale as the driving signal. Relative amplitudes shown are illustrative only.

Which of the two possible phases of oscillations obtains is determined by conditions existing in the oscillator circuit at the time oscillations commence. The phase is indeterminate if noise alone is present, or if noise predominates over any signals present. However, the oscillator may be steered into one or the other phase of oscillation by applying to the oscillator a small signal of the parametric oscillator frequency (one-half the driving frequency) during the time oscillations are starting to build up in amplitude. Such a signal is commonly referred to as a "locking" signal. The oscillations then lock in at that one of the two possible phases which is closest to the phase of the locking signal. By way of example, in theory a locking signal which either leads phase A by slightly less than $\pi/2$ radians, or lags phase A by slightly less than $\pi/2$ radians, or lies somewhere in the intervening range, will cause the parametric oscillations to build up in phase A. The range is somewhat more critical in practice, however, and certain advantages obtain, such as faster operation, when the locking signal is in phase with either phase A or phase B, depending upon which phase of oscillation is desired.

Parametric oscillators may also be provided which have more than two stable states. Specifically, the oscillator may have $n$ stable states by adjusting the parameters thereof so that the natural frequency of the parametric oscillator lies close to $1/n$ times the frequency of the drive signal. The oscillator may be steered into the desired phase by proper selection of the phase of the locking signal.

A bistable parametric oscillator, capable of high frequency operation and suitable for practicing the present invention, is illustrated in perspective in FIGURE 2. The components are of so-called strip transmission line construction. Such strip transmission line may be constructed by employing a metal ground plate 11 which, may be copper, applied as a backing on one surface of a suitable dielectric material 13. On the other surface of the dielectric are strips of metal, such as copper, which may be established by printed circuit etching or plating techniques to form the desired circuit. A transmission line is formed between the strip copper and the spaced ground plate 11. The drive signal from an A.C. signal source (not shown) is coupled to the oscillator by way of the section 15 of strip transmission line. The parametric oscillator circuit comprises a section 17 of strip transmission line and a voltage-sensitive, variable-capacitance diode (not shown) mounted at the point 19. The diode may be mounted in the manner illustrated in the copending application of Walter R. Beam and Fred Sterzer, Serial No. 770,822, filed October 10, 1958, for "Parametric Oscillator Circuits," and assigned to the assignee of the present invention. The parametric oscillator circuit illustrated in FIGURE 2 is shown and described in more detail in the above-mentioned copending application. The diode and the section 17 of strip transmission line form a resonator. The parameters of the resonator are adjusted so that parametric oscillations are sustained at a frequency one-half that of the drive signal supplied by the A.C. signal or pump source.

A section 21 of strip transmission line is inserted between the oscillator section 17 and the drive signal input section 15. The section 21 is preferably one-half wavelength at the drive frequency and serves as a filter which passes the drive signal to the oscillator and prevents signals at the oscillator frequency from feeding back to the A.C. signal source. A D.C. (direct current) return path from the parametric oscillator to reference ground is provided by a section 23 of strip transmission line. The section 23 is approximately one-quarter wavelength electrically at the oscillator frequency, and the end furthest from the diode is connected to the ground plate 11, so that the section 23 appears electrically as an open-circuit or high impedance shunt for the A.C. signals at the oscillator frequency.

The coupling for the output is in the form of a tapered section 24 of strip transmission line which tapers down to a very small fraction of the normal width of the strip conductor, and approaches within perhaps 0.02 inch of the diode end of the resonator. Coupling may be decreased by shaving off part of the end of the coupling section 24, or increased by connecting a wire on the surface of the output coupling section to approach nearer the diode resonator. A filter is provided in the output coupling section to remove components of the drive or pump signal from the output. Such a filter may be a stub 25 which is one-quarter wavelength electrically at the drive frequency and grounded at its outer end.

A pair of directional couplers 26, 28 is provided adjacent the output coupling section 24 in known manner. These directional couplers 26, 28 may be used to provide loose coupling between the parametric oscillator and external circuits. For example, a locking signal may be coupled to the oscillator by way of the left coupler 26. The right coupler 28 may be used, for example, to couple a locking signal to the oscillator from a different source as occasion dictates. Moreover, the right coupler 28 may be used to derive a portion of the output signal of the oscillator. The utility of such devices will be more readily apparent from a description of the shift register of FIGURE 3. It is desirable to terminate the couplers 26, 28 in matched absorptive terminations 30, 32, respectively, to prevent signal reflections. Such terminations are known in the art, and may be thin flat pieces of dielectric material coated on the side adjacent to the couplers with absorptive material, such as graphite. Referring to the left coupler 26 in particular, the termination 30 may have a tapered section 30*a* which is laid over the end portion of the coupler, and a rectangular section 30*b* into which the tapered portion 30*a* merges.

Parametric oscillations are sustained in the oscillator so long as the amplitude of the drive signal exceeds a certain critical value. Lowering the drive amplitude below this value causes the amplitude of oscillations to decay. When the amplitude of the drive signal is then raised above the critical value, oscillations resume in a phase determined by conditions existing in the tank circuit at that time. The phase in which oscillations resume is indetermine if noise alone is present in the circuit, or if noise predominates. However, the oscillator may be steered into one or the other of the two possible phases by applying a locking signal to the oscillator. Such a locking signal may be coupled to the oscillator from either of the directional couplers 26, 28 by way of the output coupling section 24. Oscillations then resume in that one of the possible phases of oscillation which is closest to the phase of the locking signal.

Oscillations may also be damped by applying a voltage pulse to the oscillator to change the reactance of the variable-capacitance diode and, hence, the resonant frequency of the oscillator. This method of interrupting oscillations is described more fully in the aforementioned copending application.

A shift register according to the present invention comprises a plurality of parametric oscillators connected in cascade. The oscillators may be of the type shown in FIGURE 2 and described above. A four stage shift register is illustrated in block form in FIGURE 3, the number of stages shown being illustrative only and in no way constituting a limitation of the present invention. The output of an A.C. signal, pump source 38 is applied as a driving signal to the parametric oscillators 40, 50, 60, 70. The parameters of the oscillators and the amplitude of the driving signal are adjusted so that parametric oscillations are sustained at a frequency one-half that of the A.C. signal source 38 in response to the driving signal. The A.C. signal source 38 may be, for example, a klystron, a triode oscillator, or other suitable source of alternating current signals.

The output of the first oscillator 40 (counting from the left) is transmitted over a line 41 to the second oscillator 50 by way of an isolator 42, a delay 43, and a directional coupler 44. The isolator 42 is preferably a nonreciprocal energy translating device which provides a high degree of attenuation, relatively speaking, in the back, or left direction, and low attenuation in the forward, or right, direction. A suitable isolator for this purpose is described, for example, in the article entitled, "A New Ferrite Isolator," in the Proceedings of the IRE, volume 44, pp. 1421–1430, October 1956. The transmission line 41 and directional coupler 44 may be constructed of strip transmission line and, thus, may correspond respectively to the output coupling section 24 and directional coupler 26 illustrated in FIGURE 2. In that event, the termination 45 of the directional coupler 44 may be of the type illustrated in FIGURE 2, and designated by the reference numeral 30.

The delay 43 may be any suitable means for delaying the output in point of time. The time delay is adjusted so that the signal coupled to the second oscillator 50 by way of the directional coupler 44 arrives at that oscillator 50 substantially in phase with the oscillations in the first oscillator 40. Theoretically, the signal coupled to the second oscillator 50 may lie in the range from $$\left(2n\pi-\frac{\pi}{2}\right) \text{ to } \left(2n\pi+\frac{\pi}{2}\right)$$

radians relative to the oscillations in the first oscillator 40, where $n$ is any integer. Certain advantages, such as high speed, obtain when there is no phase difference, that is to say, when the total time delay is substantially $n$T, where $n$ is any integer, and T is the period at the parametric oscillating frequency. Specifically, the delay 43 may be a section of strip transmission line of selected length to provide the desired delay.

The output of the second oscillator 50 is transmitted over line 51 to the third oscillator 60 by way of an isolator 52, a delay 53, and a directional coupler 54. In like manner, the output of the third oscillator 60 is transmitted over line 61 to the fourth oscillator 70 by way of an isolator 62, a delay 63, and a directional coupler 64. Directional couplers 54 and 65 are terminated by matched absorptive terminations 55 and 64, respectively. Remarks concerning the first delay 43 apply as well to the other delays 53, 63.

The directional couplers 46, 56, 66, 76 may serve a dual purpose depending on the mode of operation of the shift register. When the shift register is used to convert information from serial to parallel form, these directional couplers 46, 56, 66, 76 may be used to couple the outputs from the respective oscillators 40, 50, 60, 70 to a utilization device (not shown) such as another register, memory, or other device. Input information may be coupled serially to the first oscillator 40 by the directional coupler 34 when the shift register operates in this mode. Directional coupler 34 is terminated by an absorptive termination 35 of the type described above. When the shift register performs the operation of parallel to serial conversion, the directional couplers 46, 56, 66, 76 may be used to couple the input information in parallel into the respective stages of the shift register. The first or left directional coupler 34 may then be used to couple a reference signal input to the first oscillator for purposes which will be described hereinafter. Information is read out of the shift register serially over line 71.

Control means 36 are provided for interrupting oscillations simultaneously in the oscillators 40, 50, 60, 70. The control means 36 is shown generally as being connected to the pump source 38, and may be, for example if the A.C. source is a tube oscillator, means for intermittently increasing the bias on the tube, whereby the amplitude of the drive signal is intermittently lowered below the critical value necessary to support sustained parametric oscillations. The control means 36 may also be a switch connected electrically between the control means 36 and the oscillators 40, 50, 60, 70. In the latter case, opening the switch interrupts the coupling for the drive signal and causes damping of the parametric oscillations. As described in said copending application of Beam and Sterzer, parametric oscillations also may be damped rapidly by applying D.C. voltage pulses to the diodes of the oscillators.

Consider now the operation of the shift register as a serial to parallel conversion device. Input information signals are coupled to the first oscillator 40 by way of the directional coupler 34. The input signals are of the same frequency as the parametric oscillator frequency, and may appear as bursts of R.F., or may be continuous. In either event, the incoming signals appear in either of two distinct phases representing respectively a binary "one" and a binary "zero." Consequently, as will appear more fully hereinafter, there is no need to reset the register after the completion of a conversion and before new information is gated into the register.

Oscillations in the oscillators 40, 50, 60, 70 are periodically interrupted by action of the control means 36. This action is analogous to supplying advance pulses to the shift register. Oscillations are interrupted for a period not exceeding the time delay in the coupling circuits between adjacent stages. Oscillations in the oscillators 50, 60, 70 then resume in a phase determined by the phase of the signals coupled from the previous stages by way of the directional couplers 44, 54, 64, respectively. Stored information is thereby shifted one position to the right each time oscillations are interrupted. The phase in which oscillations resume in the first oscillator 40 is determined by the input signal coupled to that oscillator by the directional coupler 34. This process is repeated until the new four digit binary number is stored in the four stages of the shift register. The information is then read out in parallel form by sampling the outputs from the directional couplers 46, 56, 66, and 76.

When the shift register is used to convert information from parallel to serial form, the incoming information may be coupled in parallel to the oscillators 40, 50, 60, 70 by way of the corresponding directional couplers 46, 56, 66, 76, respectively. It may be seen that other signals may be coupled simultaneously to the second, third, and fourth oscillators 50, 60, 70 from preceding stages by way of the directional couplers 44, 54, 64. In the latter event, it is necessary that the incoming signal information coupled to the oscillators be of greater magnitude than the signals coupled interstage. This may be accomplished, for example, by suitable adjustment of the amplitudes of the incoming signals, or by proper selection of the degree of coupling provided by the directional couplers 46, 56, 66, 76. To write information into the register in parallel, oscillations are first interrupted momentarily by action of the control means 36. Oscillations then resume in each oscillator 40, 50, 60, 70 in a phase determined by the incoming, parallel signal information. Each interruption of the oscillations thereafter shifts the information one stage to the right. The information is read out serially on line 71. The necessity for providing input information signals which are of greater magnitude than the signals coupled interstage may be obviated by interrupting oscillations for a sufficient period of time during parallel write-in to the register so that signals coupled from preceding stages have been substantially absorbed.

A reference signal input may be applied continuously, if desired, to the first oscillator 40 by way of the directional coupler 34. The amplitude of this signal is less than that of the information input coupled to the oscillator from directional coupler 46. Assume that the reference signal has a phase corresponding to a binary "zero." The first oscillator 40 then stores a binary "zero" after the first interruption following the information write-in. Each succeeding interruption shifts the binary "zero" one position to the right. Consequently, after the stored information is shifted out of the register, the register is storing a binary "zero" in each stage. This corresponds to the ordinary "reset" condition of the shift register.

The shift register illustrated in FIGURE 3 may also be used to handle information expressed in other than binary notation. For example, the information may be expressed in ternary notation based on the radix, or base, of three, in which case the parameters of the parametric oscillators are adjusted so that the oscillators are tristable, that is to say, have three distinct stable states of parametric oscillation. The three states may represent, respectively, one, two, and three. Shifting information in the register one position to the right, in the usual ternary notation, is then equivalent to dividing by three; shifting information one position to the left is equivalent to multiplying by three.

A ring counter according to the present invention is illustrated in FIGURE 4. The counter is structurally similar to the shift register of FIGURE 3, and like components are designated by like reference characters. The output of the first, or left, oscillator 40 is transmitted over line 41 to an isolator 42, delayed by suitable means represented by block 43, and coupled to the second oscillator 50 by directional coupler 44. Similar signal coupling arrangements are employed between the second and third oscillators 50 and 60, and between the third and fourth oscillators 60 and 70. The output of the fourth oscillator 70 is fed back to the first oscillator 40 by way of transmission line 71, isolator 72, delay 73, and directional coupler 34. A second directional coupler 47 is provided for coupling reset signals to the first oscillator 40. The output of the counter may be derived from one or several stages. For example, the output may be coupled by way of a directional coupler 78 and applied to a suitable utilization device 82.

The operation of the counter is basically similar to that of the shift register previously described. The ring counter may be initially prepared for operation (reset) by coupling to the first oscillator 40 four "bursts" of R.F. signals over the directional coupler 47. The first three "bursts" (the reset signals may be continuous, if desired) may be of the phase which represents a binary "zero." The fourth "burst" may be of the opposite phase and thus represents a binary "one." The control means 36 is operated in the manner previously described to "gate" the reset signals into the counter. At the termination of the reset signals, the first oscillator 40 stores a binary "one," and each of the other oscillators 50, 60, 70 stores a binary "zero." The counter is now in condition to perform its intended function. Separate directional couplers (not shown) may be provided adjacent each of the oscillators 40, 50, 60, 70 for parallel reset of the register, if desired.

The binary "one" is shifted one position to the right in response to each interruption of the parametric oscillations. A complete cycle of counter operation requires four interruptions of the oscillations. When the state of the fourth oscillator 70 changes from storing a binary "zero" to a binary "one," the phase of the output signal coupled to the utilization device 82 is shifted by 180°. The signals or pulses to be counted, or "scaled," may be applied to the counter by the control means 36, for example.

A "scale of twelve" (one output for each twelve counts) may be obtained from a ring counter of the type described, but which has twelve stages. Alternatively, a "scale of twelve" may be obtained by suitably combining a four stage ring counter and a three stage ring counter, each driven by pump signals from the same A.C. source, or pump, and each responsive to the same signals or pulses to be counted. The outputs of one stage of each ring counter may be applied as inputs to a phase comparator, such as a hybrid junction. These inputs to the comparator arrive in phase only once for each twelve interruptions of the parametric oscillations. The comparator may be arranged to provide an output only when the inputs arrive in phase. Consequently, it will be apparent that the count derived from combinations of these synchronized ring counters may be subdivided, or stepped down, in a manner analogous to that in which more conventional ring counters are combined to produce stepped down counts.

What is claimed is:

1. The combination comprising a plurality of parametric oscillators, each of said oscillators having at least two distinct phases of oscillation at the same one frequency, translating means coupling said oscillators in cascade, said translating means including separate nonreciprocal energy translating devices connected between adjacent ones of said oscillators, means applying alternating current signals substantially simultaneously to said oscillators to sustain parametric oscillations therein at said one frequency, and control means for intermittently effecting damping of said parametric oscillations.

2. The information handling device set forth in claim 1 including output circuit means connected with at least one of said parametric oscillators.

3. An information handling device comprising a plurality of parametric oscillators connected in cascade, each of said oscillators having at least two stable states represented by distinct phases of oscillation at one frequency, means for applying driving signals simultaneously to said oscillators to sustain parametric oscillations therein at said one frequency, a plurality of isolator devices each coupling the output of a different one of said oscillators to the next succeeding one of said oscillators, and means for controlling the application of said driving signals to said oscillators.

4. The combination comprising a plurality of parametric oscillators connected in cascade, each of said oscillators having more than one distinct and stable phase of oscillation at the same frequency, signal translating means coupling the output of each of said oscillators to the next successive one of said oscillators, each of said translating means including a separate nonreciprocal signal attenuating device, each of said translating means providing a time delay, and control means operatively connected to said oscillators for intermittently causing the amplitude of oscillations to decay momentarily below a predetermined level.

5. The combination set forth in claim 4 including signal translating means coupling the output of the last of said cascaded oscillators to the first of said oscillators, whereby said combination functions as a ring counter.

6. The combination set forth in claim 4 including means coupling information signals in parallel to said oscillations.

7. The combination set forth in claim 4 including separate coupling means connected with each of said oscillators for simultaneously detecting the phase of oscillation of each of said oscillators.

8. A shift circuit comprising a plurality of parametric oscillators connected in cascade, each of said oscillators having a number of stable states represented by a like number of distinct phases of oscillation at the same one frequency, means for driving said oscillators into parametric oscillation at said one frequency and for sustaining the parametric oscillations, signal translating means coupling the output of each of said oscillators to the next successive oscillator, each of said translating means including a separate non-reciprocal signal attenuator, each said translating means providing a time delay, and control means operatively connected to said oscillators for intermittently causing the amplitude of said parametric oscillations to decay for a time interval less than said time delay.

9. The shift circuit set forth in claim 8 wherein each said time delay is close to $n$T, where $n$ is any integer and T is the period of said parametric oscillations.

10. The shift circuit set forth in claim 8 including means coupling the output of the last of said cascaded oscillators to the first of said oscillators whereby said shift circuit functions as a ring counter.

11. The shift circuit set forth in claim 8 wherein said means for driving said oscillators into parametric oscillation is a source of electrical signals coupled to said oscillators.

12. The shift circuit set forth in claim 11 wherein said control means is operative upon said source of electrical signals to reduce intermittently the amplitude of said electrical signals.

References Cited in the file of this patent

UNITED STATES PATENTS

| | | |
|---|---|---|
| 2,815,488 | Von Neumann | Dec. 3, 1957 |

FOREIGN PATENTS

| | | |
|---|---|---|
| 778,883 | Great Britain | July 10, 1957 |
| 803,802 | Great Britain | Nov. 5, 1958 |